(12) United States Patent
Jung

(10) Patent No.: US 10,152,087 B2
(45) Date of Patent: Dec. 11, 2018

(54) FLEXIBLE DISPLAY DEVICE

(71) Applicant: Samsung Display Co., Ltd., Yongin-si (KR)

(72) Inventor: Chansung Jung, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 113 days.

(21) Appl. No.: 15/141,319

(22) Filed: Apr. 28, 2016

(65) Prior Publication Data

US 2017/0123460 A1 May 4, 2017

(30) Foreign Application Priority Data

Oct. 30, 2015 (KR) .......................... 10-2015-0151539

(51) Int. Cl.
  *G06F 3/041* (2006.01)
  *G06F 1/16* (2006.01)
  *G06F 3/044* (2006.01)

(52) U.S. Cl.
  CPC .......... *G06F 1/1652* (2013.01); *G06F 1/1626* (2013.01); *G06F 1/1677* (2013.01); *G06F 1/1694* (2013.01); *G06F 3/044* (2013.01); *G06F 3/0416* (2013.01); *G06F 2203/0381* (2013.01); *G06F 2203/04102* (2013.01)

(58) Field of Classification Search
  USPC ............... 345/173, 156, 207, 609, 105, 420; 715/769
  See application file for complete search history.

(56) References Cited

U.S. PATENT DOCUMENTS

| 7,258,011 | B2 | 8/2007 | Nasiri et al. |
| 8,970,455 | B2 * | 3/2015 | Thorson .................. G06F 3/147 345/105 |
| 9,158,364 | B2 | 10/2015 | Nakajima et al. |
| 9,213,432 | B2 * | 12/2015 | Hwang ................. G06F 3/0412 |
| 9,646,407 | B2 * | 5/2017 | Lee .......................... G06F 3/041 345/173 |
| 2011/0122107 | A1 * | 5/2011 | Onkura ................. G06F 1/1616 345/207 |
| 2011/0126141 | A1 * | 5/2011 | King ..................... G06F 1/1616 715/769 |

(Continued)

FOREIGN PATENT DOCUMENTS

| KR | 10-2014-0021900 | 2/2014 |
| KR | 10-2014-0081425 | 7/2014 |

(Continued)

*Primary Examiner* — Thuy Pardo
(74) *Attorney, Agent, or Firm* — H.C. Park & Associates, PLC

(57) ABSTRACT

A flexible display device including a display panel including a first space area and a second space area; a touch panel disposed on the display panel to sense a touch signal; a first sensor disposed on the touch panel in the first space area and configured to sense a first coordinate signal for the first space area; a second sensor disposed on the touch panel in the second space area and configured to sense a second coordinate signal for the second space area; and a driving control unit configured to calculate a folding angle between the first space area and the second space area based on the first and second coordinate signals and calculate a coordinate of a touch point based on the touch signal.

16 Claims, 12 Drawing Sheets

(56) References Cited

U.S. PATENT DOCUMENTS

| | | | |
|---|---|---|---|
| 2014/0043263 A1 | 2/2014 | Park et al. | |
| 2014/0098095 A1* | 4/2014 | Lee | G06F 3/041 345/420 |
| 2014/0176831 A1 | 6/2014 | Lee et al. | |
| 2014/0202014 A1 | 7/2014 | Choi et al. | |
| 2014/0340299 A1* | 11/2014 | Lee | G06F 1/1652 345/156 |
| 2014/0375574 A1* | 12/2014 | Kim | G06F 3/147 345/173 |
| 2014/0375702 A1* | 12/2014 | Cho | G06F 1/3265 345/690 |
| 2015/0062025 A1* | 3/2015 | Lee | G06F 3/0412 345/173 |
| 2015/0169006 A1 | 6/2015 | Chong et al. | |
| 2015/0220195 A1* | 8/2015 | Jin | G06F 1/1643 345/173 |
| 2015/0220299 A1* | 8/2015 | Kim | G06F 1/1605 345/1.3 |
| 2015/0293620 A1* | 10/2015 | Cho | G06F 1/1643 345/173 |
| 2016/0041669 A1* | 2/2016 | de Paz | G06F 3/1438 |
| 2016/0202781 A1* | 7/2016 | Kim | G06F 1/1652 345/173 |
| 2018/0059717 A1* | 3/2018 | Kim | G06F 3/0488 345/173 |

FOREIGN PATENT DOCUMENTS

| | | |
|---|---|---|
| KR | 10-2014-0094333 | 7/2014 |
| KR | 10-2015-0069379 | 6/2015 |

* cited by examiner

FLEXIBLE DISPLAY DEVICE

CROSS-REFERENCE TO RELATED APPLICATION

This application claims priority from and the benefit of Korean Patent Application No. 10-2015-0151539, filed on Oct. 30, 2015, which is hereby incorporated by reference for all purposes as if fully set forth herein.

BACKGROUND

Field

Exemplary embodiments relate to a display device. More particularly, exemplary embodiments relate to a flexible display device.

Discussion of the Background

Various display devices are being developed which are used for multimedia devices, such as televisions, cellphones, tablet computers, navigation devices, game consoles, or the like. An input device of a display device may include a keyboard, mouse, or the like. Recently, the display devices have included a touch panel as an input device.

Various types of display devices are being recently developed which differ from a typical flat-panel display device. Various flexible display devices are being developed, such as a curved display device, bent display device, foldable display device, rollable display device, stretchable display device, or the like. In particular, a foldable display device needs to change an image signal according to an angle at which the display device is bent. In this case, because the display device includes an acceleration sensor, it is possible to provide an image signal to which such a folding angle is applied.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a flexible display device that may control, with a single driving IC, a plurality of acceleration sensors on a touch panel.

Additional aspects will be set forth in the detailed description which follows, and, in part, will be apparent from the disclosure, or may be learned by practice of the inventive concept.

An exemplary embodiment of the inventive invention discloses a flexible display device including a display panel including a first space area and a second space area, a touch panel disposed on the display panel to sense a touch signal, a first sensor disposed on the touch panel in the first space area and configured to sense a first coordinate signal for the first space area, a second sensor disposed on the touch panel in the second space area and configured to sense a second coordinate signal for the second space area, and a driving control unit configured to calculate a folding angle between the first space area and the second space area based on the first and second coordinate signals and calculate a coordinate of a touch point based on the touch signal.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
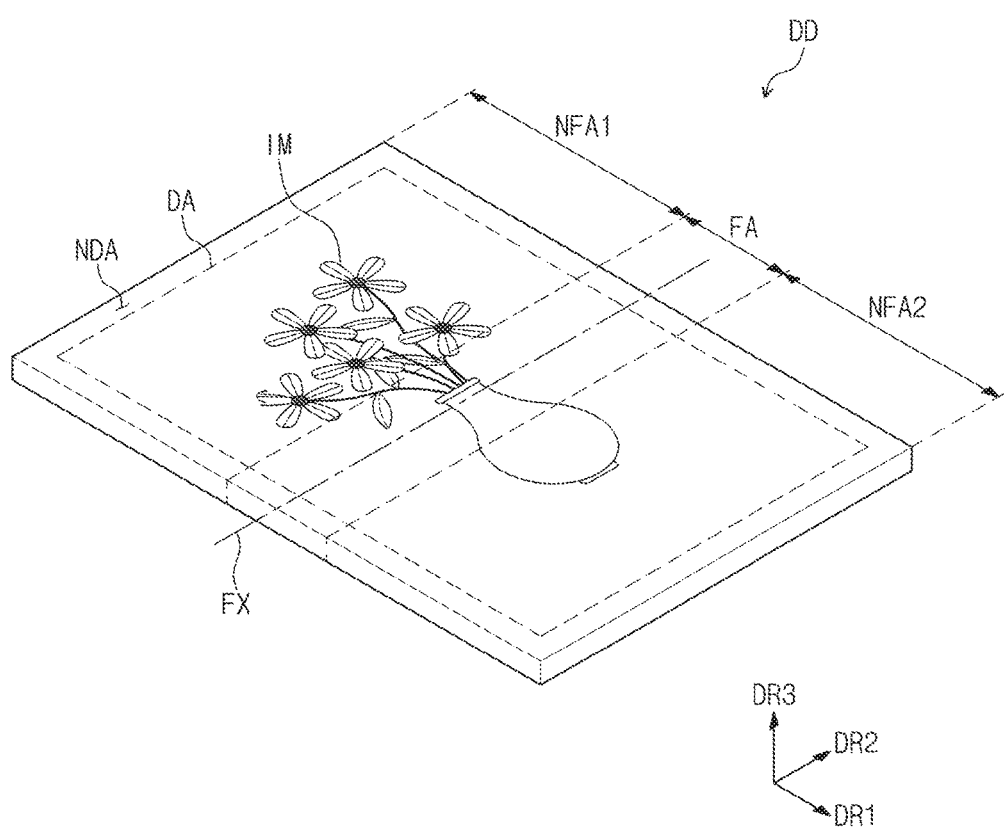
FIG. 1 is a perspective view of a flexible display device according to an exemplary embodiment of the inventive concept.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
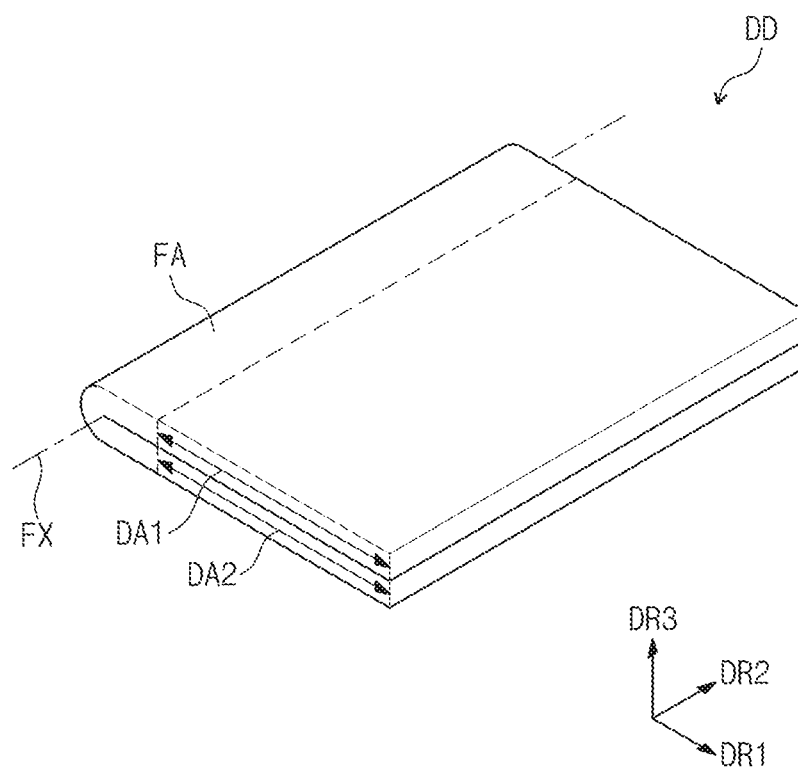
FIG. 2 is a perspective view of a flexible display device folded based on a folding axis in FIG. 1.

FIG. 1 is a perspective view of a flexible display device according to an exemplary embodiment. FIG. 2 is a perspective view of a flexible display device folded based on a folding axis in FIG. 1.

FIGS. 1 and 2 are perspective views of a flexible display device DD according to an exemplary embodiment. In the present exemplary embodiment, a foldable display device is shown as an example of a flexible display device DD (hereinafter, referred to as a "display device"). However, the inventive concept is not limited thereto and may be applied to various display devices DD, such as a curved display device, a bent display device, a rollable display device, a stretchable display device, and the like. Though not shown separately, the display device DD according to the inventive concept may be used for a mid-size/small electronic device, such as a cellphone, a personal computer (PC), a notebook computer, a personal digital assistant, a car navigation unit, a game console, a portable electronic device, a wrist watch type electronic device, or a camera, as well as a large electronic device, such as a television or an outdoor billboard.

As shown in FIGS. 1 and 2, a display plane on which an image IM is displayed is parallel to a plane that is defined by a first direction DR1 and a second direction DR2. A third direction DR3 indicates a normal of the display plane. The third direction DR3 indicates the thickness direction of the flexible display device DD. The front and rear of the each member are identified by the third direction DR3. However, because directions DR1 to DR3 indicate are relative concepts, they may be changed to different directions.

As shown in FIG. 1, the display device DD may include a plurality of areas that are divided on the display plane. The display device DD may be divided into a display area DA and a non-display area NDA according to whether to display the image IM. The display area DA is an area on which an image is displayed, and the non-display area NDA is an area which is adjacent to the display area DA and on which an image is not displayed. FIG. 1 shows an image of a vase as an example of the image IM. As an example, the display area DA may have a quadrilateral shape. The non-display area NDA may enclose the display area DA. The display device DD may be defined by a folding area FA that is folded along a folding axis FX according to its operation, and a first non-folding area NFA1 and a second non-folding area NFA2 that are non-folded.

Figure 3:
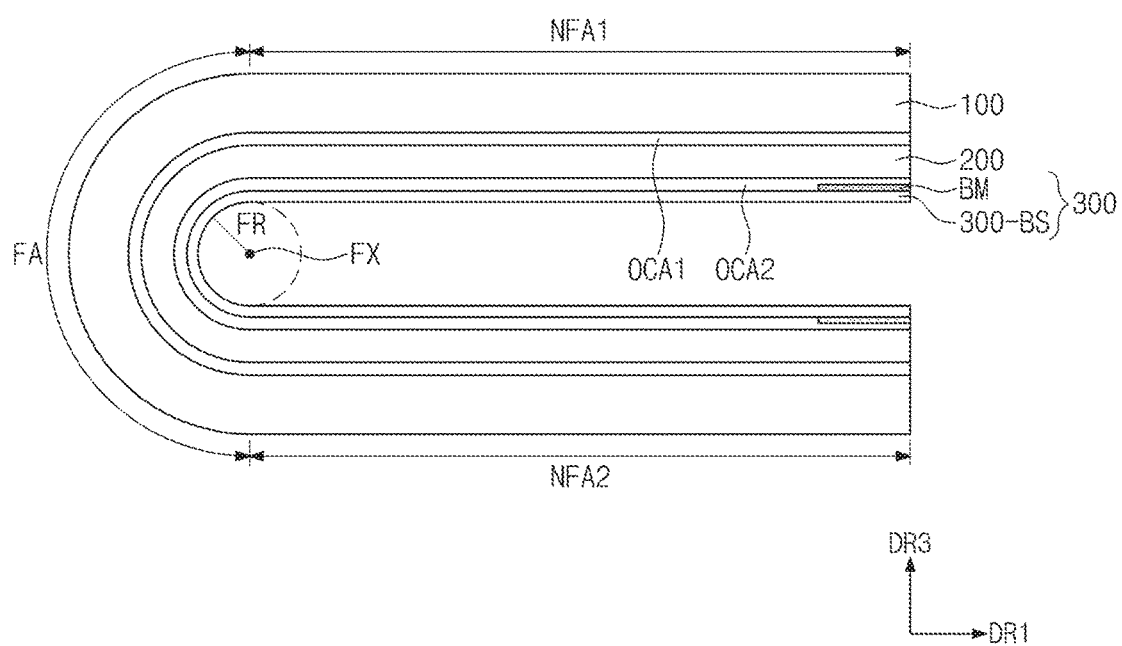
FIG. 3 is an enlarged cross-sectional view of a flexible display device according to an exemplary embodiment.

FIG. 3 is an enlarged cross-sectional view of a flexible display device according to an exemplary embodiment. As shown in FIG. 3, the display device DD may be folded along the folding axis FX so that the display plane of the first non-folding area NFA1 and the display plane of the second non-folding area NFA2 face each other. In the following, being folded to enable the display planes of different areas to face each other is defined as "inner folding".

According to an exemplary embodiment, because the first non-folding NFA1 rotates clockwise along the folding axis FX, the foldable display device may experience inner folding. Though not shown separately, the display device DD may also be folded along the folding axis FX so that the display plane of the first non-folding area NFA1 and the display plane of the second non-folding area NFA2 face outside. In the following, being folded to enable the display planes of different areas to face outside is defined as "outer folding".

Specifically, the display device DD may include a display panel 100, a touch panel 200, and a window member 300. Though not shown separately, the display device DD may further include a protective member that is coupled to the window member 300 to protect the display panel 100 and the touch panel 200. Each of the display panel 100, the touch panel 200, and the window member 300 may have a flexible property.

The display panel 100 generates an image IM (see FIG. 1A) that corresponds to input image data. The display panel 100 may be a liquid crystal display (LCD) panel, an organic light-emitting display panel, an electrophoretic display panel, or an electrowetting display panel, and its type is not limited thereto. According to the description of the inventive concept, the organic light-emitting display panel will now be described as an example.

The touch panel 200 may obtain coordinate information regarding a touch point. The touch panel 200 may be disposed at the front of the display panel 100. However, the positional relation between the display panel 100 and the touch panel 200 is not limited thereto. The touch panel 200 may be a contact type or non-contact type touch panel. A touch panel 200 is described below.

The window member 300 may include a base member 300-BS and a black mattress BM. The black mattress BM may be disposed at the rear of the base member 300-BS to define the bezel area of the display device DD, i.e., the non-display area NDA (see FIG. 1A). The base member 300-BS may include a glass substrate, a sapphire substrate, a plastic film, or the like. The black mattress BM may be a colored organic layer and may be formed by using e.g., coating. Though not shown separately, the window member 300 may further include a functional coating layer that is disposed at the front of the base member 300-BS. The functional coating layer may include an anti-fingerprint layer, an anti-reflection layer, a hard coating layer, or the like.

The display panel 100 and the touch panel 200 may be coupled by means of an optically clear adhesive film OCA1. The touch panel 200 and the window member 300 may also be coupled by means of an optically clear adhesive film OCA2.

According to an exemplary embodiment, the touch panel 200 in FIG. 3 may be implemented as an add-on type in which the touch panel is coupled to the display panel 100 by means of the optically clear adhesive film OCA1.

However, the inventive concept is not limited thereto. As an example, the touch panel 200 may be implemented as an on-cell type in which the touch panel is patterned directly on the display panel 100. In this case, the optically clear adhesive film OCA1 may be omitted. Also, the touch panel 200 may also be implemented as an in-cell type, for example.

Figure 4:
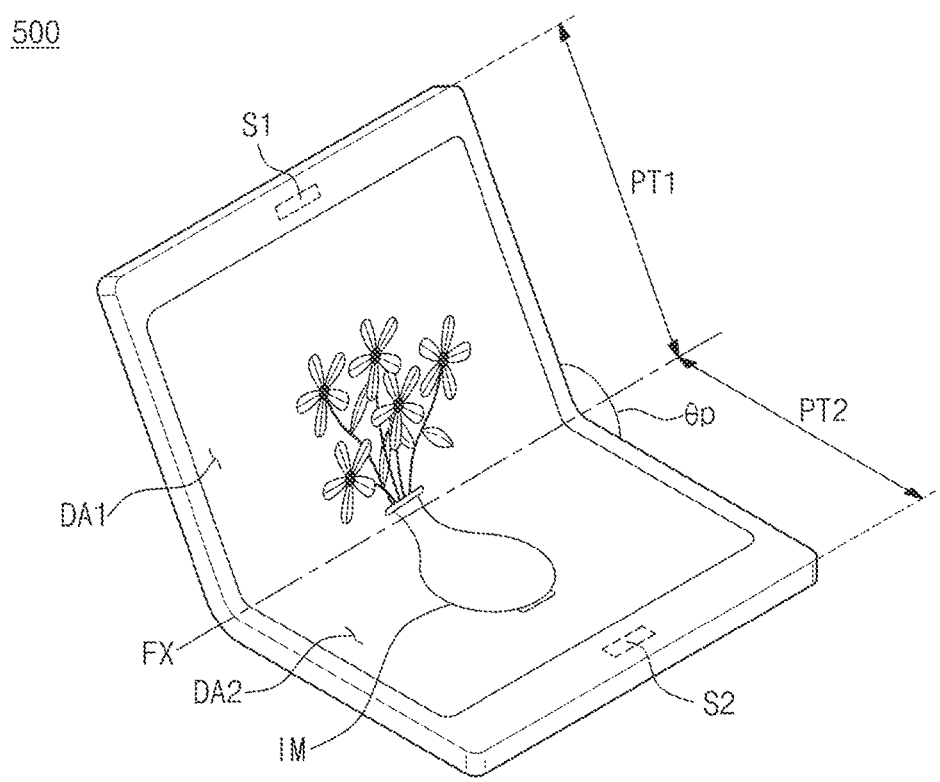
FIG. 4 is a perspective view of a flexible display device bent based on a folding angle according to an exemplary embodiment.
Figure 4:
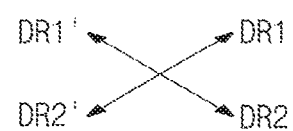

FIG. 4 is a perspective view of a flexible display device bent based on a folding angle according to an exemplary embodiment.

Referring to FIG. 4, the display device DD may include a first space area PT1 and a second space area PT2. Although FIG. 4 shows that the first space area PT1 and the second space area PT2 have the same length/area about the folding axis FX, the first space area PT1 and the second space area PT2 may have different lengths/areas.

According to an exemplary embodiment, the display device DD may be bent by means of an external force that is externally applied. The first space area PT1 and the second space area PT2 may be bent in the normal direction DR3 as shown in FIG. 1 on a plane that is defined in the first and second directions DR1 and DR2. According to FIG. 4, the first space area PT1 may be bent in the normal direction DR3 about the folding axis FX. The second space area PT2 may be disposed on a plane that is defined in the first and second directions DR1 and DR2.

In this case, the display device DD may be bent so that the first display area DA1 and the second display area DA2 have a folding angle about the folding axis FX. In this example, the folding angle $\theta p$ is defined as an angle that the top surface of the first display area DA1 makes with the top surface of the second display area DA2.

Also, the term "bent" may be interpreted to mean that a shape is not fixed and an original shape changes to another shape. Also, the term 'bent' includes being curved in a curve form or being rolled in a scroll form, as well as being folded or twisted along one or more specific lines or areas.

For example, the above-described folding angle $\theta p$ may be substantially an obtuse angle. However, the inventive concept is not limited thereto, and the folding angle $\theta p$ may vary according to an external force that a user applies. For example, the folding angle $\theta p$ may be provided at a substantially acute angle. In this case, the display device DD may be provided which is folded so that the first space area PT1 and the second space area PT2 overlap vertically.

As the display device DD may be bent based on the folding angle $\theta p$, there is also a need to provide an image to be displayed on the first display area DA1 and the second display area DA2, as an image to which the folding angle $\theta p$ is applied.

According to an exemplary embodiment, the display device DD may include a first sensor S1 in the first space area PT1, and a second sensor S2 in the second space area PT2.

The first sensor S1 may sense a first coordinate signal, and the second sensor S2 may sense a second coordinate signal. The first coordinate signal may consist of spatial information regarding the first space area PT1. The first coordinate signal may include spatial information at a point corresponding to the first space area PT1, as well as a spatial information set at all or some of points on an area defined as the first space area PT1. The first coordinate signal may include spatial information regarding a point on which the first sensor S1 is disposed.

Also, the first coordinate signal may consist of values sensed at several different time points. For example, any time before the display device DD is bent is defined as a first time point, and another time at which the display device DD is bent is defined as a second time point. In this case, the first coordinate signal may include spatial information regarding the first space area PT1 at the first time point, and spatial information regarding the first space area PT1 at the second time point.

The second coordinate signal may consist of spatial information regarding the second space area PT2. The second coordinate signal may include spatial information at a point corresponding to the second space area PT2, as well as a spatial information set at all or some of points on an area defined as the second space area PT2. The second coordinate signal includes spatial information regarding a point on which the second sensor S2 is disposed.

Also, the second coordinate signal may consist of values sensed at many different time points. For example, any time before the display device DD is bent is defined as a first time point, and another time at which the display device DD is bent is defined as a second time point. In this case, the second coordinate signal may include spatial information regarding the second space area PT2 at the first time point, and spatial information regarding the second space area PT2 at the second time point.

As described above, the display device according to the inventive concept may be bent according to the folding angle θp. In this case, the display device DD may display an image based on the first coordinate signal and the second coordinate signal that are sensed from the first sensor S1 and the second sensor S2.

Figure 5:
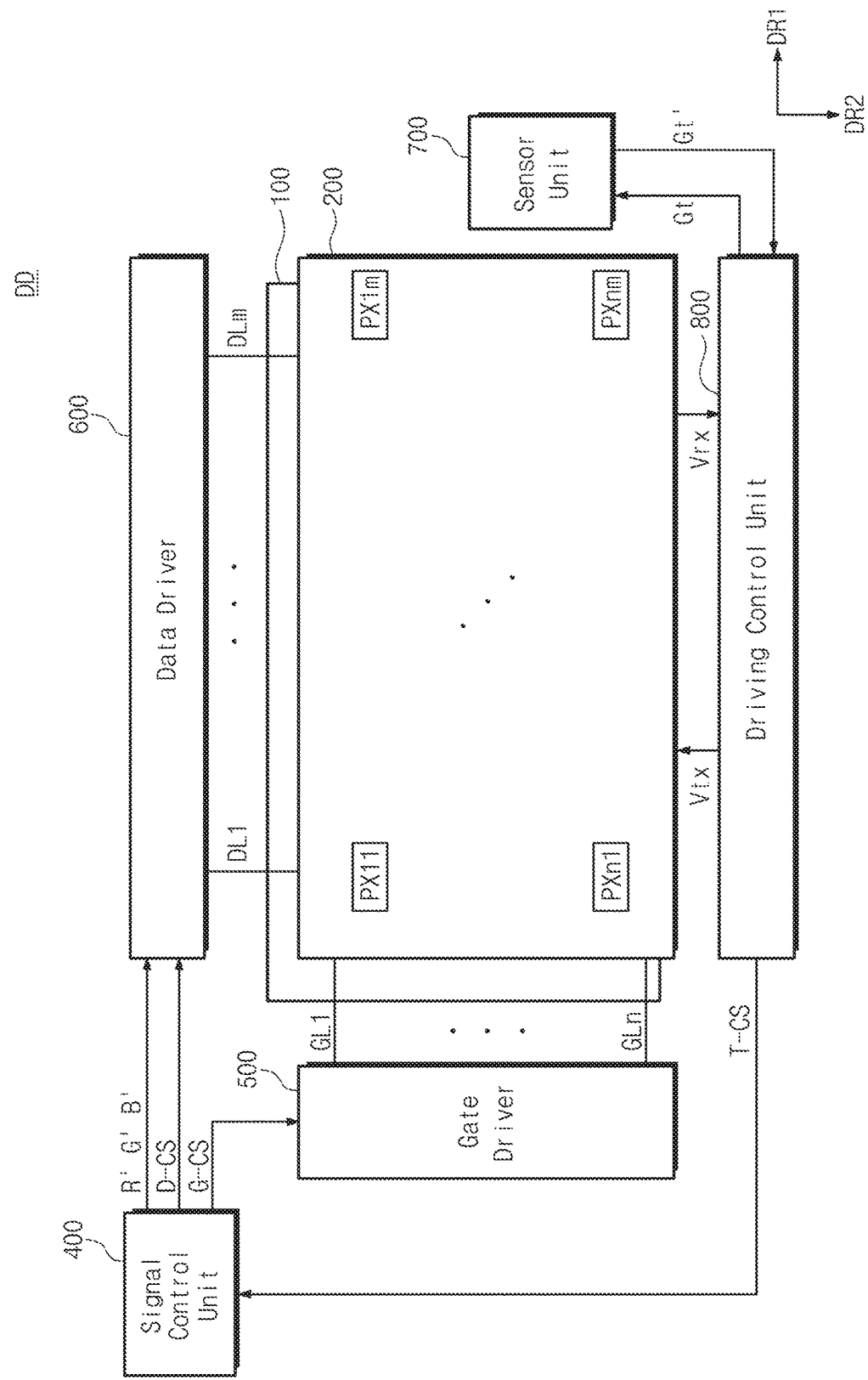
FIG. 5 is a block diagram of a display device according to an exemplary embodiment.

FIG. 5 is a block diagram of a display device according to an exemplary embodiment of the inventive concept.

Referring to FIG. 5, the display device DD may include a display panel 100, a touch panel 200, a signal control unit 400, a gate driver 500, a data driver 600, a sensor unit 700, and a driving control unit 800.

The display panel 100 may include a plurality of gate lines GL1 to GLn, a plurality of data lines DL1 to DLm, and a plurality of pixels PX11 to PXnm. The gate lines GL1 to GLn extend in a first direction DR1 and are arranged in a second direction DR2. The data lines DL1 to DLm intersect with the gate lines GL1 to GLn and are insulated therefrom. The gate lines GL1 to GLn are connected to the gate driver 500, and the data lines DL1 to DLm are connected to the data driver 600.

The pixels PX11 to PXnm may be arranged in the form of a matrix. Each of the plurality of pixels PX11 to PXnm is connected to a corresponding gate line and a corresponding data line among the gate lines GL1 to GLn and the data lines DL1 to DLm.

The touch panel 200 may be disposed on the display panel, and be of a capacitive type, electromagnetic induction type, or hybrid type. According to an exemplary embodiment, the touch panel 200 is described as a capacitive touch panel but may be of an electromagnetic induction type or hybrid type. Also, the touch panel 200 may include two kinds of sensors that intersect with each other, and there is no limitation in type.

The signal control unit 400 may receive a plurality of image signals RGB from the outside and convert the image signals RGB into image data R'G'B' that match the operation mode of the display panel 100. Also, the signal control unit 400 may receive various control signals CS, e.g., a vertical synchronization signal, a main clock signal, a data enable signal, or the like, and outputs a gate control signal G-CS and a data control signal D-CS.

The gate driver 500 may output gate signals to the gate lines GL1 to GLn in response to the gate control signal G-CS. The gate control signal G-CS may include a vertical start signal that starts the operation of the gate driver 500, a gate clock signal that determines the output time of a gate voltage, and an output enable signal that determines the on pulse width of the gate voltage.

The data driver 600 may receive a data control signal D-CS and image data R'G'B'. The data driver 600 converts the image data R'G'B' into data voltages to provide the data voltages to the data lines DL1 to DLm. The data control signal D-CS includes a horizontal start signal that starts the operation of the data driver 600, an inverting signal that inverts the polarity of data voltages, and an output indication signal that determines a time point at which the data voltages are output from the data driver 600.

The sensor unit 700 may include a plurality of sensors in order to calculate a folding angle θp according to the bending of the display device DD. The sensors according to the inventive concept may be disposed on the touch panel 200 and electrically connected to the driving control unit 800 through sensor signal lines. The inventive concept is not limited thereto and the positions of the sensors and sensor signal lines may vary. As an example, the sensors and the sensor signal lines may also be disposed on a flexible PCB.

Each of the sensors may sense the coordinate signal Gt' of the current point that corresponds to a folding angle θp. Each of the sensors may deliver the sensed coordinate signal Gt' to the driving control unit 800. According to an exemplary embodiment, each of the sensors in the sensor unit 700 may be provided as an acceleration sensor that is applied as a single chip.

In the following, the sensor unit 700 according to the inventive concept includes a first sensor S1 and a second sensor S2.

Because a single sensor typically utilizes a single driving IC, a plurality of driving ICs corresponding to the plurality of sensors is disposed in the display device. Thus, unnecessary power consumption and spatial constraints are imposed.

However, the display device DD according to the inventive concept may have a characteristic that controls the plurality of sensors with a single driving IC. Specifically, the driving control unit 800 may control the operations of the touch panel 200 and the sensor unit 700 as a whole. That is, the driving control unit 800 according to the inventive concept may be provided as a single IC that controls the operations of the touch panel 200 and the sensor unit 700.

Specifically, the driving control unit 800 may generate a scan signal Vtx required for the driving of the touch panel 200, and provide the signal to the touch panel 200. As an example, the scan signal Vtx may be, sequentially or simultaneously, output to a plurality of touch electrodes that are disposed at the touch panel. Also, the driving control unit 800 may receive a sensing signal Vrx from the touch panel 200. The driving control unit 800 may calculate coordinate information on a touch point based on the sensing signal Vrx. Related descriptions are provided in detail in FIG. 10.

The driving control unit 800 may also provide a driving signal Gt required for the driving of the sensor unit 700 to the sensor unit 700. The sensor unit 700 may sense a coordinate signal Gt' according to a folding angle θp based on the driving signal Gt and deliver the sensed coordinate signal Gt' to the driving control unit 800.

Figure 6:
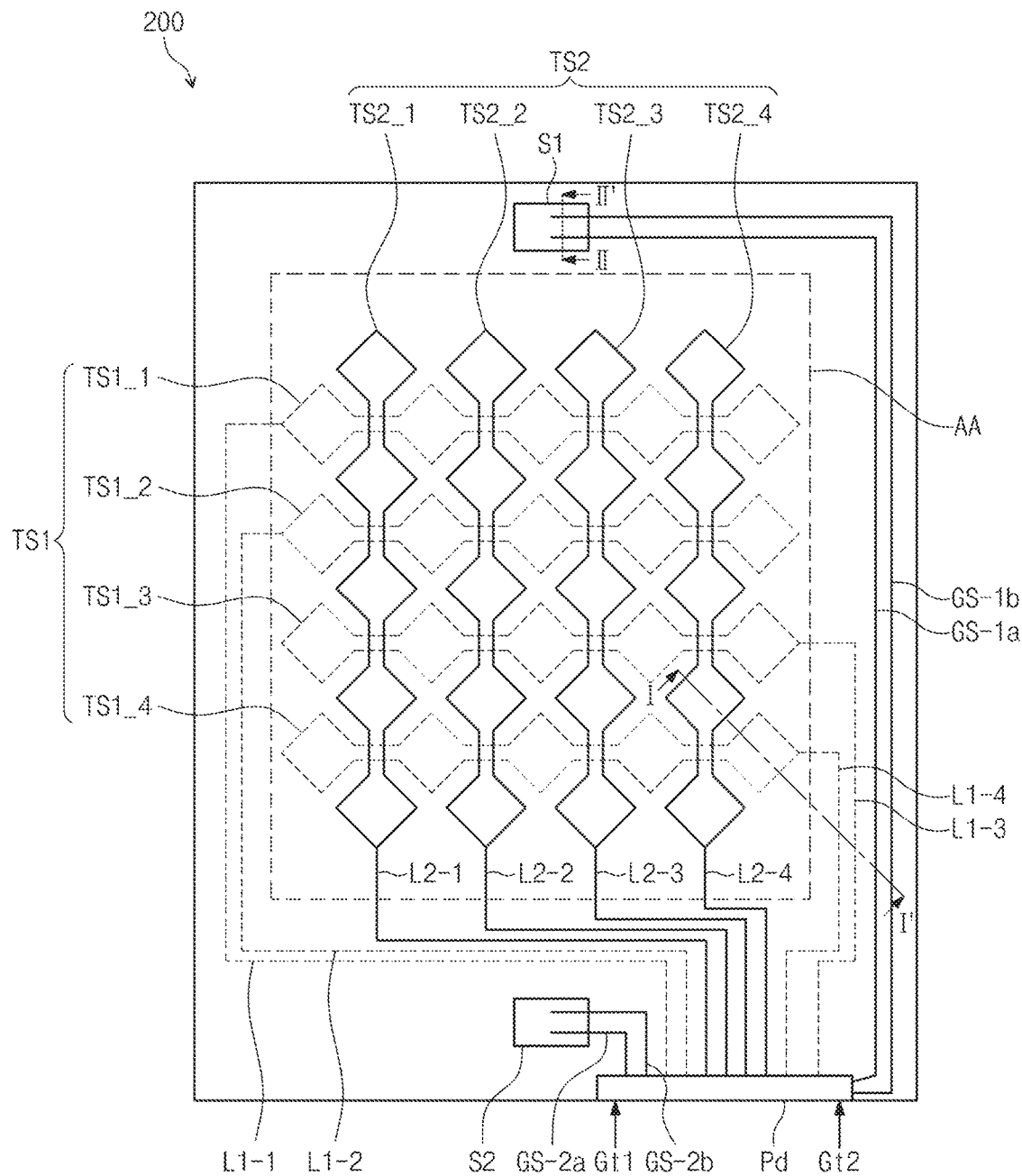
FIG. 6 is a plan view of a touch panel in FIG. 5 according to an exemplary embodiment.
Figure 7:
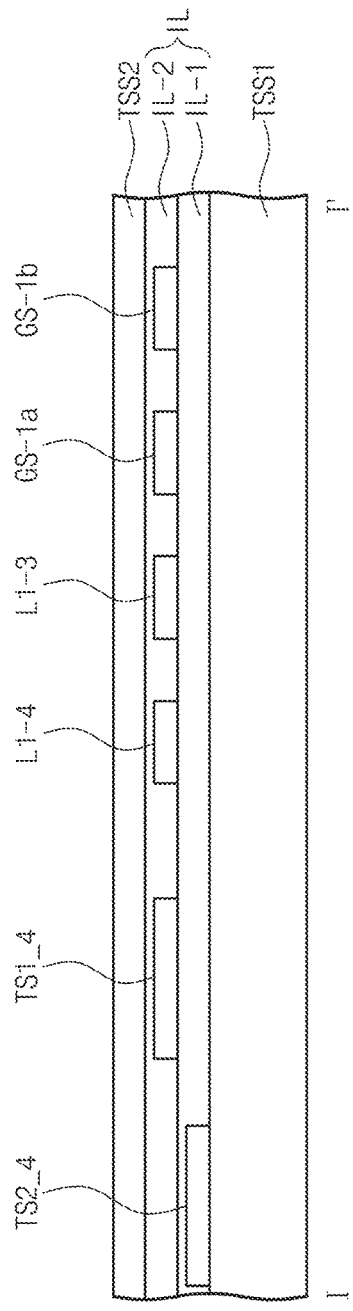
FIG. 7 is a cross-sectional view taken along line I-I' in FIG. 6 according to an exemplary embodiment.
Figure 8:
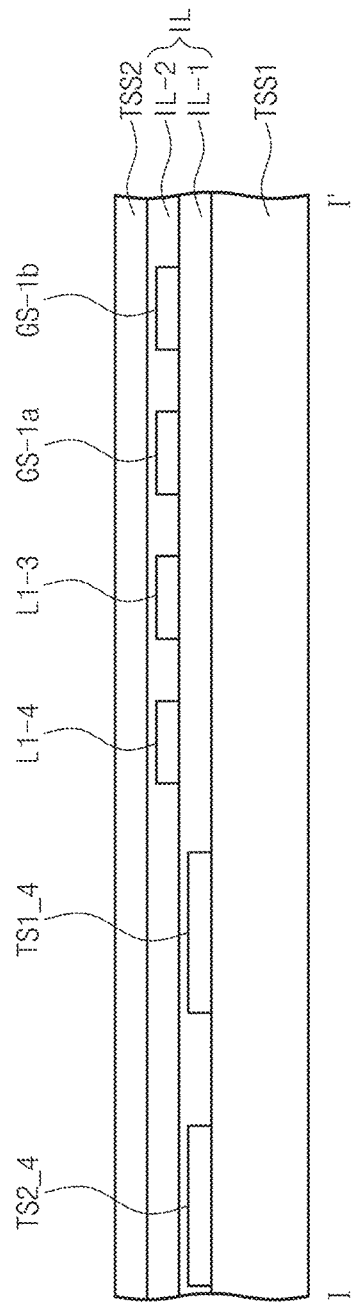
FIG. 8 is a cross-sectional view taken along line I-I' in FIG. 6 according to another exemplary embodiment.
Figure 9:
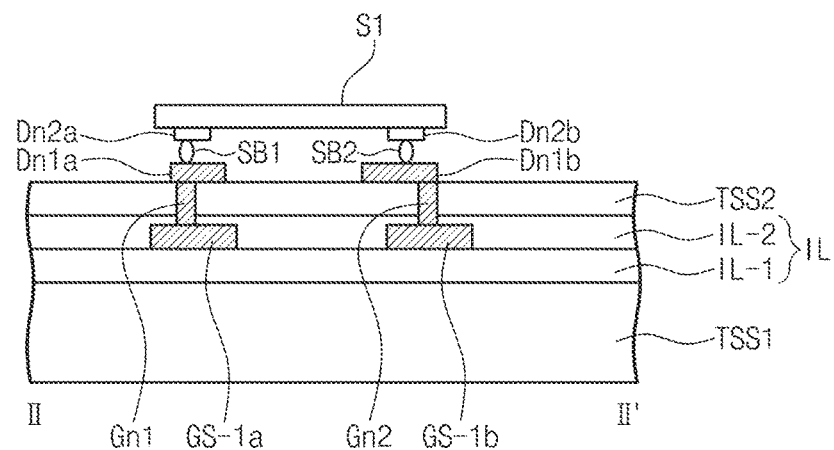
FIG. 9 is a cross-sectional view taken along line II-II' in FIG. 6.

FIG. 6 is a plan view of the touch panel in FIG. 5 according to an exemplary embodiment. FIG. 7 is a cross-sectional view taken along line I-I' in FIG. 6. FIG. 8 is a cross-sectional view taken along line I-I' in FIG. 6 according to another exemplary embodiment. FIG. 9 is a cross-sectional view taken along line II-II' in FIG. 6.

Referring to FIG. 6, the touch panel 200 may include at least one insulating layer, a touch electrode, and a signal line that is connected to the touch electrode.

Specifically, the touch panel 200 may include a plurality of first touch electrodes TS1_1 to TS1_4 (hereinafter, referred to as TS1) and a plurality of first signal lines L1_1 to L1_4 (hereinafter, referred to as L1). The first touch electrodes TS1 are electrically connected to the first signal lines L1 to receive a scan signal Vtx. The touch panel 200 may also include a plurality of second touch electrodes TS2_1 to TS2_4 (hereinafter, referred to as TS2) that are insulated from the first touch electrodes TS1, and a plurality of second signal lines L2_1 to L2_4 (hereinafter, referred to as L2) that are electrically connected to the second touch electrodes. The driving control unit 800 may receive a sensing signal Vrx through the second signal lines L2.

According to an exemplary embodiment, the first touch electrodes TS1 may, sequentially or simultaneously, receive the scan signal Vtx. The touch panel 200 according to the inventive concept may also obtain coordinate information regarding a touched point based on any one of a mutual capacitance type and a self capacitance type.

According to an exemplary embodiment, the touch panel 200 may include a first sensor S1 and a second sensor S2. The first sensor S1 and the second sensor S2 may be disposed on the non-touch area of the touch panel 200 that encloses a touch area AA. That is, the first sensor S1 and the second sensor S2 may be disposed on the non-touch area of the touch panel 200 where a touch is not sensed. In this example, the non-touch area may correspond to the non-display area NDA.

The touch panel 200 may also include a first sensor signal line GS-1$a$ and a second sensor signal line GS-1$b$ that are disposed on the same layer as the second signal lines L2 and electrically connected to the first sensor S1. The touch panel 200 may include a third sensor signal line GS-2$a$ and a fourth sensor signal line GS-2$b$ that are disposed on the same layer as the second signal lines L2 and electrically connected to the second sensor S2.

Referring to the cross-sectional view in FIG. 7, the touch panel 200 includes a first touch substrate TSS1, an insulating layer IL, and a second touch substrate TSS2.

According to an exemplary embodiment, the first touch electrodes TS1 and the first signal lines L1 may be disposed on the same layer. The second touch electrodes TS2 and the second signal lines L2 may be disposed on the same layer. The first and second sensor signal lines GS-1$a$ and GS-1$b$ according to the inventive concept may also be disposed on the same layer as the second signal lines L2.

Specifically, the first touch substrate TSS1 may provide a base plane. The first touch electrodes TS1 and the first signal lines L1 (not shown) may be disposed on the base plane of the first touch substrate TSS1. A first insulating layer IL-1 that may cover the first touch electrodes TS1 and the first signal lines L1 may be disposed on the base plane of the first touch substrate TSS1. The second touch electrodes TS2 and the second signal lines L2 may be disposed on the first insulating layer IL-1. A second insulating layer IL-2 that may cover the second touch electrodes TS2 and the second signal lines L2 may be disposed on the first insulating layer IL-1. The first and second sensor signal lines GS-1$a$ and GS-1$b$ may also be disposed on the second insulating layer IL-2.

The second touch substrate TSS2 that covers the second touch electrodes TS2, the second signal lines L2, and the first and second sensor signal lines GS-1$a$ and GS-1$b$ may be disposed on the second insulating layer IL-2. However, the inventive concept is not limited thereto, and the second touch substrate TSS2 may be omitted. In this case, a window member 300 (see FIG. 2) may be patterned directly on the touch panel 200.

Referring to the cross-sectional view in FIG. 8 according to another exemplary embodiment, the first touch electrode TS1 and the second touch electrode TS2 may be disposed on the same layer. The first signal lines L1 and the second signal lines L2 may be disposed on the same layer. Also, the first and second sensor signal lines GS-1$a$ and GS-1$b$ according to the inventive concept may be disposed on the same layer as the second signal lines L2.

Specifically, the first touch substrate TSS1 may provide a base plane. The first touch electrodes TS1 and the second touch electrodes TS2 may be disposed on the base plane of the first touch substrate TSS1. A first insulating layer IL-1 that covers the first touch electrodes TS1 and the second touch electrodes TS2 is disposed on the base plane of the first touch substrate TSS1. The first signal lines L1 (not shown) and the second signal lines L2 are disposed on the first insulating layer IL-1. A second insulating layer IL-2 that covers the first signal lines L1 and the second signal lines L2 is disposed on the first insulating layer IL-1. The first and second sensor signal lines GS-1$a$ and GS-1$b$ may also be disposed on the second insulating layer IL-2.

The second touch substrate TSS2 that covers the second touch electrodes TS2, the second signal lines L2, and the first and second sensor signal lines GS-1$a$ and GS-1$b$ may be disposed on the second insulating layer IL-2. However, the inventive concept is not limited thereto, and the second touch substrate TSS2 may be omitted. In this case, a window member 300 (see FIG. 2) may be patterned directly on the touch panel 200.

Thus, in the case that the window member 300 may be patterned on the second insulating layer IL-2, the first sensor S1 and the second sensor S2 may be disposed on the second insulating layer IL-2. In the case that the second touch substrate TSS2 may be disposed on the second insulating layer IL-2, the first sensor S1 and the second sensor S2 may be disposed on the second touch substrate TSS2.

The second touch substrate TSS2 is omitted in the cross-sectional view in FIG. 9. However, the inventive concept may also include a case where the second touch substrate TSS2 is included. Although the first sensor S1 is described in FIG. 9, the structure and operation of the second sensor S2 may also be the same as those of the first sensor S1.

According to an exemplary embodiment, the first and second sensor signal lines GS-1$a$ and GS-1$b$ may be disposed on the first insulating layer IL-1. The first sensor S1, and a first conductive pattern Dn1$a$ and a second conductive pattern Dn1$b$ that are electrically connected to the first sensor S1 may be disposed on the second insulating layer IL-2. The first conductive pattern Dn1$a$ may be electrically connected to the first sensor signal line GS-1$a$ through a first through-hole Gn1. The second conductive pattern Dn1$b$ may be electrically connected to the second sensor signal line GS-1$b$ through a second through-hole Gn2.

Although not shown, a third insulating layer may be disposed on the second insulating layer IL-2 in order to cover the first conductive pattern Dn1$a$ and the second conductive pattern Dn1$b$. In this case, a portion of the third insulting layer may be etched so that the first conductive pattern Dn1$a$ and the second conductive pattern Dn1$b$ are exposed.

The first sensor S1 may also include a first signal terminal Dn2$a$ and a second signal terminal Dn2$b$. The first signal terminal Dn2$a$ may be electrically connected to the first sensor signal line GS-1$a$, and the second signal terminal Dn2$b$ may be electrically connected to the second sensor signal line GS-1$b$.

Specifically, the first signal terminal Dn2$a$ may be electrically connected to the first conductive pattern Dn1$a$ through a first shoulder pump SB1. Thus, a driving signal Gt (see FIG. 5) output from the driving control unit 800 may be delivered to the first shoulder pump SB1 through the first sensor signal line GS-1$a$. As a result, the driving signal Gt may be provided to the first sensor S1 through the first shoulder pump SB1 and the first signal terminal Dn2$a$ that is connected to the first shoulder pump SB1.

A first coordinate signal sensed from the first sensor S1 may also be provided to a second shoulder pump SB2 through the second signal terminal Dn2$b$. As a result, the signal may be provided to the driving control unit 800 through the second shoulder pump SB2 and the second sensor signal line GS-1$b$ that is connected to the second shoulder pump SB2.

Figure 10:
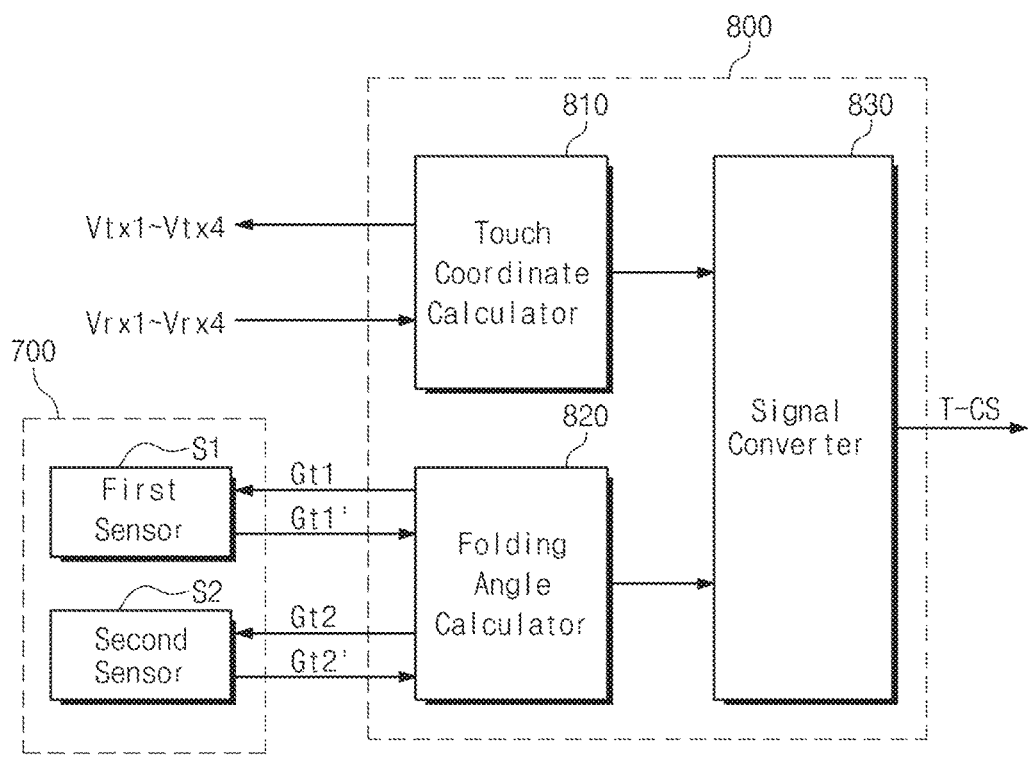
FIG. 10 is a block diagram of a sensor unit and a driving control unit in FIG. 5 according to an exemplary embodiment.
Figure 11:
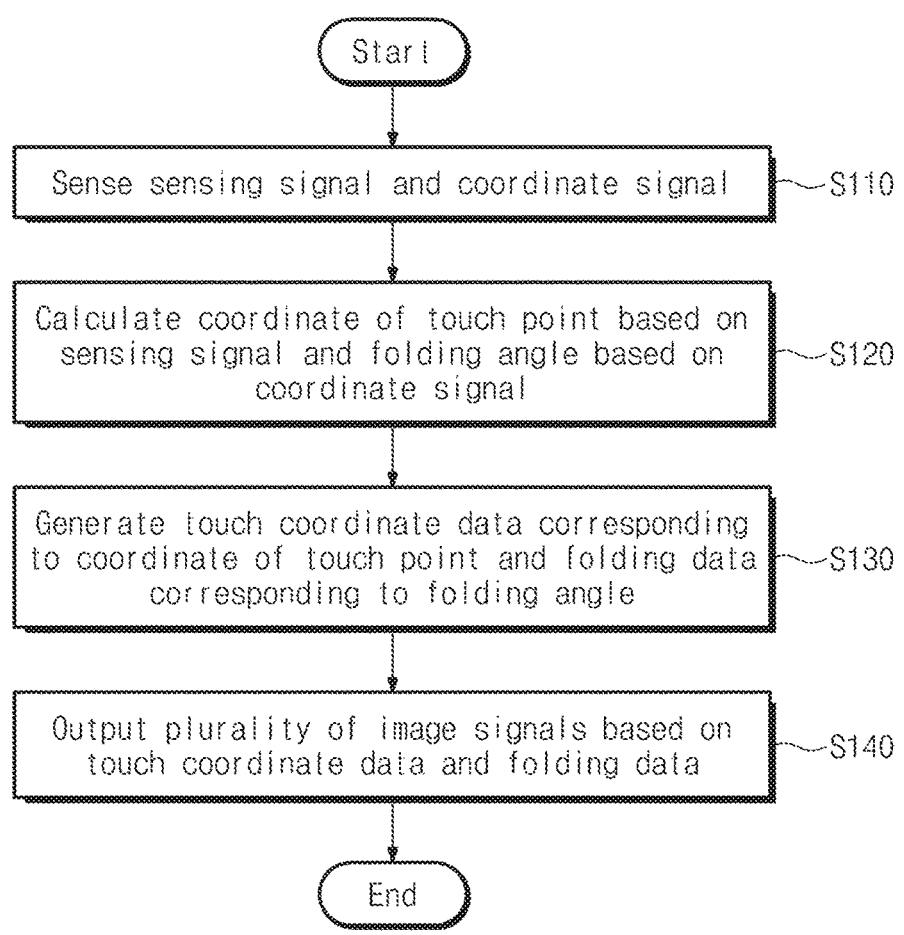
FIG. 11 is a flowchart of the operation of a flexible display device according to an exemplary embodiment.
Figure 12A:
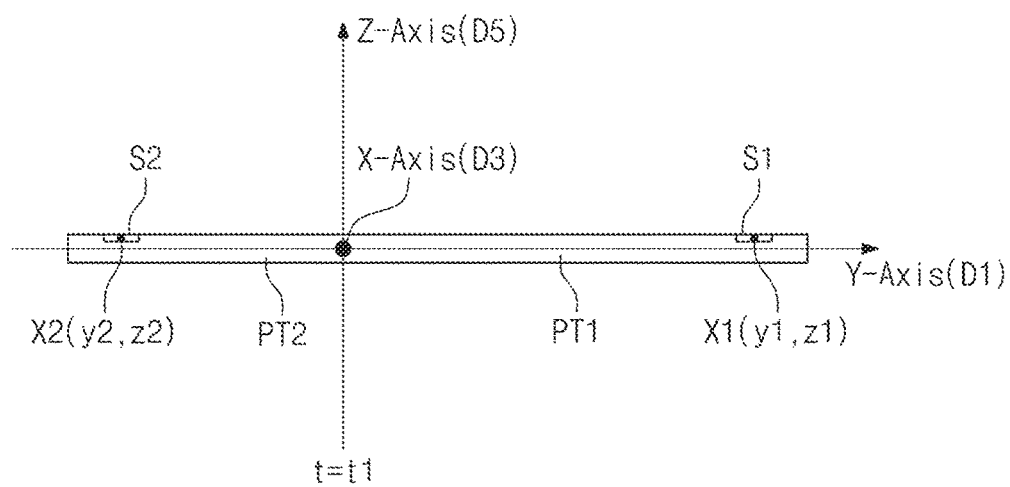
FIG. 12A is a side view of a flexible display device according to an exemplary embodiment.
Figure 12B:
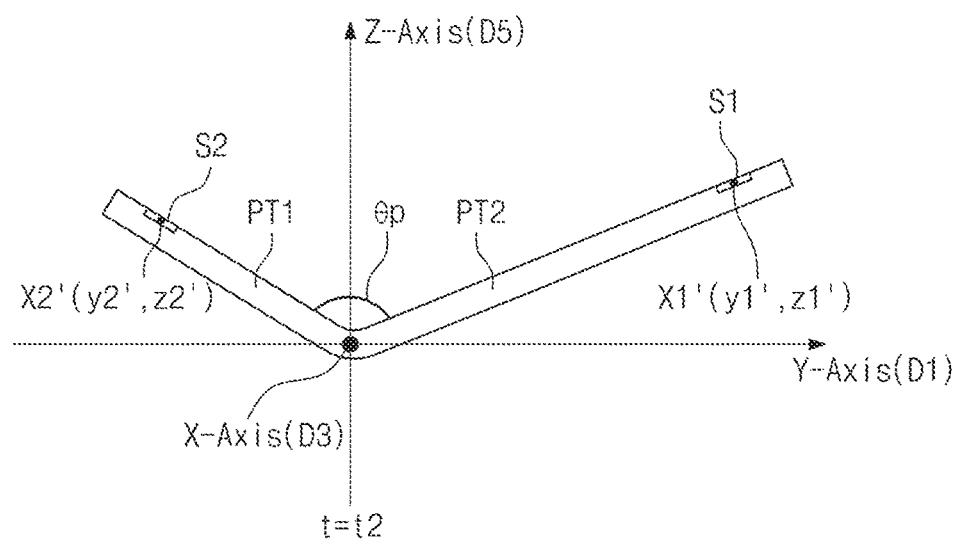
FIG. 12B is a side view when a flexible display unit in FIG. 12A is bent.

FIG. 10 is a block diagram of the sensor unit and the driving control unit in FIG. 5 according to an exemplary embodiment. FIG. 11 is a flowchart showing the operation of a display device according to an exemplary embodiment. FIG. 12A is a side view of a flexible display device according to an embodiment. FIG. 12B is a side view when a flexible display unit in FIG. 12A is bent.

Referring to FIGS. 6, 10, and 11, the sensor unit 700 may include the first sensor S1 and the second sensor S2. The driving control unit 800 includes a touch coordinate calculator 810, a folding angle calculator 820, and a signal converter 830.

According to an exemplary embodiment, the display device DD may generate an image to be displayed on the first display area DA1 and the second display area DA2, based on coordinate information regarding a touch point and a folding angle θp at which the display device DD is bent.

Specifically, the touch coordinate calculator 810 provides first to fourth scan signals Vtx1 to Vtx4 to the first touch electrodes TS1 in the touch panel 200, in first step S110. Then, the touch coordinate calculator 810 senses, from the second touch electrodes TS2, first to fourth sensing signals Vrx1 to Vrx4 that correspond to coordinate information regarding a touch point.

The folding angle calculator 820 provides the first driving signal Gt1 to the first sensor S1, and provides the second driving signal Gt2 to the second sensor S2. The first sensor S1 senses the first coordinate signal Gt1' of the first space area PT1 (see FIG. 4) according to the folding angle θp, based on the first driving signal Gt1. The first sensor S1 provides the first coordinate signal Gt1' sensed to the folding angle calculator 820. The second sensor S2 senses the second coordinate signal Gt2' of the second space area PT2 (see FIG. 4) according to the folding angle θp, based on the second driving signal Gt2. The second sensor S2 provides the second coordinate signal Gt2' sensed to the folding angle calculator 820.

Although the folding angle calculator 820 provides a driving signal to each of the first sensor S1 and the second sensor S2, the first sensor S1 and the second sensor S2 may receive a driving signal from the outside, not the folding angle calculator 820. In this case, the first sensor S1 may be electrically connected to the folding angle calculator 820 through a single sensor signal line that receives the first coordinate signal Gt1'. Likewise, the second sensor S2 may be electrically connected to the folding angle calculator 820 through a single sensor signal line that receives the second coordinate signal Gt2'.

In second step S120, the touch coordinate calculator 810 may calculate coordinate information regarding a touch point based on the first to fourth sensing signals Vrx1 to Vrx4. The folding angle calculator 820 may calculate the folding angle θp based on the first coordinate signal Gt1' and the second coordinate signal Gt2'.

Specifically, FIG. 12A shows a state in which the display device DD is completely unfolded at a first time point t1, and FIG. 12B shows a state in which the display device DD is bent at a second time point t2. In FIGS. 12A and 12B, the y-axis is defined in a first reference direction D1, the x-axis is defined in a third reference direction D3, and a fifth reference direction is defined in a direction perpendicular to the first and third reference directions D1 and D3. The z-axis is defined in the fifth reference direction D5. In FIGS. 12A and 12B, the third reference direction D3 is a direction passing through the paper.

The first coordinate signal Gt1' includes a first initial coordinate X1 and a first last coordinate X1'. The first initial coordinate X1 is the coordinate of the first sensor S1 at the first time point t1 and has a first initial coordinate value (y1, z1) Also, the first last coordinate X1' is the coordinate of the first sensor S1 at the second time point t2 and has a first last coordinate value (y1', z1')

The second coordinate signal Gt2' includes a second initial coordinate X2 and a second last coordinate X2'. The second initial coordinate X2 is the coordinate of the second sensor S2 at the first time point t1 and has a second initial coordinate value (y2, z2) The second last coordinate X2' is the coordinate of the second sensor S2 at the second time point t2 and has a second last coordinate value (y2', z2')

Because the display device DD at the first time t1 has an unfolded state, z1 and z2 have the same value.

The folding angle calculator 820 calculates, as an initial median value, the value between the first initial coordinate X1 in the first coordinate signal Gt1' and the second initial coordinate X2 in the second coordinate signal Gt2' at the first time point t1. Subsequently, the folding angle calculator 820 calculates, as a last median value, the value between the first last coordinate X1' in the first coordinate signal Gt1' and the second last coordinate X2' in the second coordinate signal Gt2' at the second time point t2.

The folding angle calculator 820 may calculate the folding angle θp based on time information according to the first and second time points t1 and t2 and the initial and last median values.

To discuss the operation of the driving control unit 800, the touch coordinate calculator 810 calculates coordinate information on a touch point based on the first to fourth sensing signals Vrx1 to Vrx4 that are sensed from the second touch electrodes TS2, in third step S130. Subsequently, the touch coordinate calculator 810 delivers, to the signal converter 830, a touch coordinate signal having coordinate information on a touch point.

The folding angle calculator 820 delivers, to the signal converter 830, a folding angle signal that has folding angle θp information that is calculated based on the first coordinate signal Gt1' and the second coordinate signal Gt2'.

The signal converter 830 converts a touch coordinate signal provided from the touch coordinate calculator 810 into touch coordinate data to match an interface specification with the signal control unit 400 (see FIG. 5). The signal converter 830 also converts a folding angle signal provided from the folding angle calculator 820 into folding angle data to match an interface specification with the signal control unit 400. Subsequently, the signal converter 830 delivers, to the signal control unit 400, a driving control signal T-CS that includes the touch coordinate data and the folding angle data.

Although, according to the description of the inventive concept, it is described that the signal converter 830 provides the touch coordinate data and the folding angle data to the signal control unit 400, the inventive concept is not limited thereto. That is, the touch coordinate calculator 810 and the folding angle calculator 820 according to the inventive concept may deliver a corresponding signal directly to the signal control unit 400. In this case, the signal converter 830 may be omitted.

In fourth step S140, the signal control unit 400 may output a plurality of image signals based on the touch coordinate data and the folding angle data. As a result, the image signals to which the touch coordinate data and the folding angle data are applied may be displayed on the display panel 100.

Figure 13:
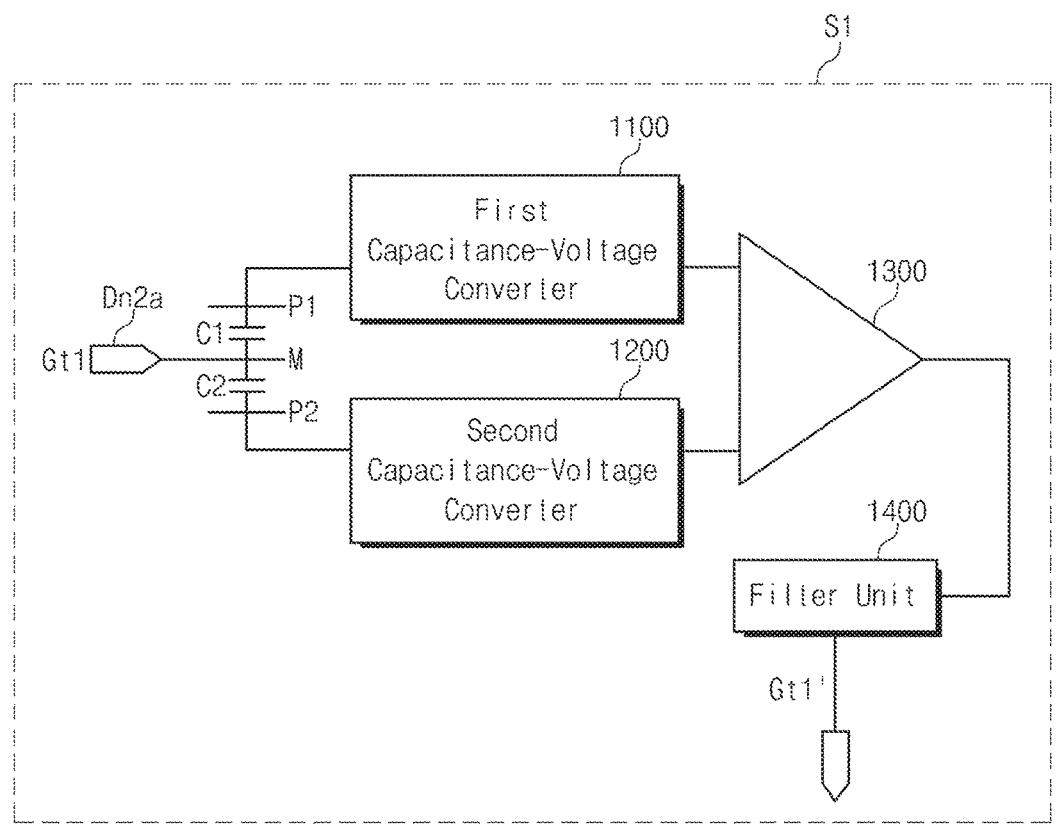
FIG. 13 is a circuit diagram of a sensor shown in FIG. 9.

FIG. 13 is a circuit diagram of a sensor in FIG. 9.

The sensor in FIG. 13 may be applied to the first sensor S1 and the second sensor S2 in FIG. 9. In the following, sensor shown in FIG. 13 is e.g., the first sensor S1. The first sensor S1 and the second sensor S2 according to an exemplary embodiment may also be provided as an acceleration sensor that is of a capacitive type.

Referring to FIG. 13, the first sensor S1 may include a first capacitance-voltage converter 1100, a second capacitance-voltage converter 1200, a differential amplifier 1300, a filter unit 1400, a first electrode P1, a second electrode P2, a motion electrode M, a first signal terminal Dn2a, and a second signal terminal Dn2b.

The first sensor S1 may receive a first driving signal Gt1 from the driving control unit 800 through the first signal terminal Dn2a.

The motion electrode M may be disposed between the first electrode P1 and the second electrode P2 and receive the first driving signal Gt1. In particular, the motion electrode M may move according to the bending of the display device DD.

For example, the motion electrode M is fixed, a first capacitance C1 between the first electrode P1 and the motion electrode M may be the same as a second capacitance C2 between the second electrode P2 and the motion electrode M.

On the contrary, in the case that the motion electrode M moves according to the bending of the display device DD, the values of the first capacitance C1 and the second capacitance C2 be different from each other.

The first capacitance-voltage converter 1100 may be connected to the first electrode P1 to convert the first capacitance C1 into a first conversion voltage. The first capacitance-voltage converter 1100 delivers a first conversion signal corresponding to the first conversion voltage to a first terminal (not shown).

The second capacitance-voltage converter 1200 may be connected to the second electrode P2 to convert the second capacitance C2 into a second conversion voltage. The second capacitance-voltage converter 1200 delivers a second conversion signal corresponding to the second conversion voltage to a second terminal (not shown).

The differential amplifier 1300 delivers, to the filter unit 1400, a value corresponding to the difference between the voltage value of the first conversion signal and the voltage value of the second conversion signal as a first coordinate signal.

The filter unit 1400 may perform a filtering operation to remove the noise from the first coordinate signal that is delivered from the differential amplifier 1300, or amplify the intensity of a signal. The filter unit 1400 delivers the filtered first coordinate signal Gt1' to the driving control unit 800 through the second signal terminal Dn2b.

Although the configuration of the acceleration sensor in shown in FIG. 13 is described as an example, the technical spirit of the inventive concept is not limited thereto. That is, a plurality of sensors in the sensor unit 700 according to the inventive concept has a characteristic as an acceleration sensor of a capacitive type and the structure of the acceleration sensor may vary.

Figure 14:
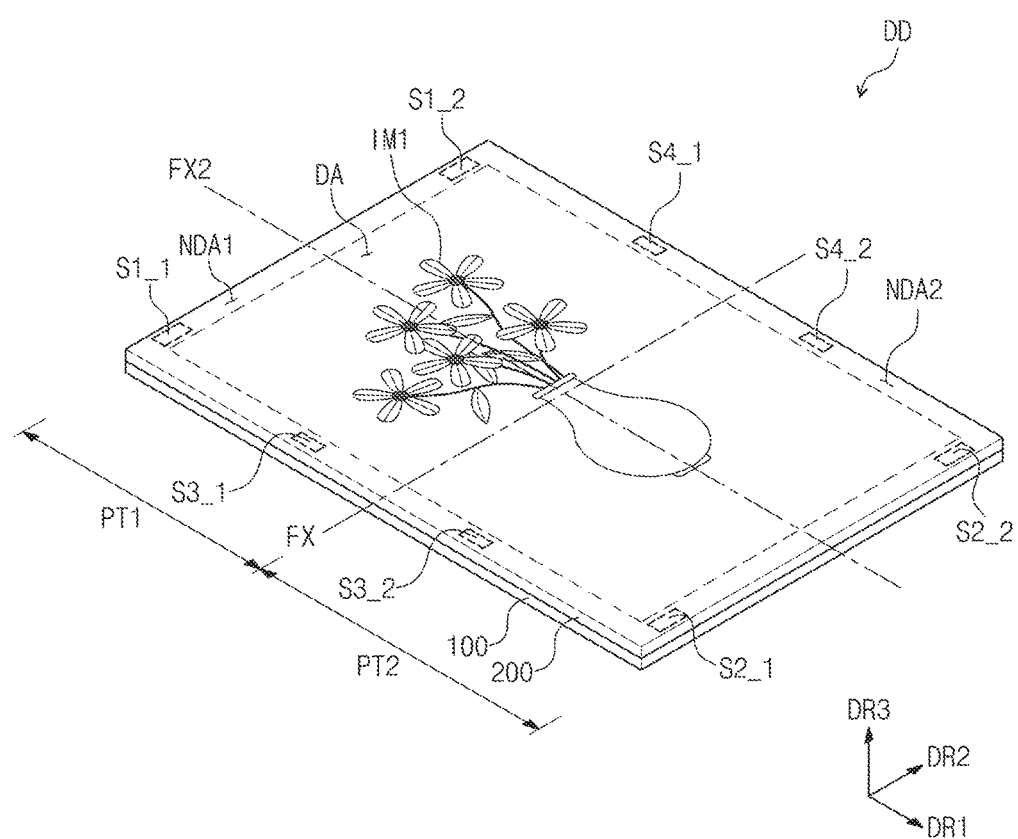
FIG. 14 is a plan view of a touch panel according to another exemplary embodiment.

FIG. 14 is a display device according to another exemplary embodiment.

When compared to the display device DD in FIG. 3, the display device DD2 in FIG. 14 has a different number of sensors in the sensor unit 700, and the structure and operation of remaining components may be the same. Thus, the descriptions of remaining components may be omitted.

Referring to FIG. 14, the display device DD2 may include a plurality of sensors disposed on the first space area PT1. As an example, first to fourth sensors S1_1 to S4_1 may be disposed on the first space area PT1 of the display device DD2. In this case, the first to fourth sensors S1_1 to S4-1 may be disposed on the first non-display area NDA1 of the first space area PT1.

The display device DD2 may include a plurality of sensors disposed on the second space area PT2. As an example, first to fourth sensors S1_2 to S4_2 may be disposed on the second space area PT2 of the display device DD2. In this case, the first to fourth sensors S1_2 to S4-2 may be disposed on the second non-display area NDA2 of the second space area PT2.

Because the display device DD2 includes a plurality of sensors that is disposed on each of the first space area PT1 and the second space area PT2, it is possible to calculate information on the folding angle θp according to the bending of the display device DD2 in more detail.

According to an exemplary embodiment, because a plurality of acceleration sensors are controlled by means of a single driving IC, it is possible to decrease the overall power consumption and size of the display device.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A flexible display device comprising:
   a display panel comprising a first space area and a second space area;
   a touch panel disposed on the display panel and configured to sense a touch signal;
   a first sensor disposed on the touch panel in the first space area and configured to sense a first coordinate signal for the first space area;
   a second sensor disposed on the touch panel in the second space area and configured to sense a second coordinate signal for the second space area; and
   a driving control unit configured to calculate a folding angle value between the first space area and the second space area based on the first and second coordinate signals and calculate a coordinate of a touch point based on the touch signal,
   wherein the driving control unit comprises:
      a touch coordinate calculator configured to calculate the coordinate of the touch point based on the touch signal; and
      a folding angle calculator configured to receive the first coordinate signal and the second coordinate signal and calculate the folding angle value.

2. The flexible display device of claim 1, wherein the driving control unit further comprises a signal converter configured to generate touch coordinate data that corresponds to the coordinate of the touch point, and folding data that corresponds to the folding angle value.

3. The flexible display device of claim 2, further comprising a signal control unit configured to output a plurality of image signals,
   wherein the signal control unit is configured to output the image signals based on the folding data and the touch coordinate data.

4. The flexible display device of claim 1, wherein a plurality of the first sensors and a plurality of the second sensors are disposed on the touch panel.

5. The flexible display device of claim 4, wherein the folding angle calculator is configured to calculate the folding angle value based on a plurality of coordinate signals that are sensed from the plurality of first sensors and the plurality of second sensors.

6. The flexible display device of claim 1, wherein the touch panel comprises at least one insulating layer, a touch electrode, and a signal line connected to the touch electrode.

7. The flexible display device of claim 6, wherein:
the touch panel further comprises a first sensor signal line that is connected to the first sensor, and a second sensor signal line that is connected to the second sensor; and
the sensor signal lines are disposed on a same layer as the signal line.

8. The flexible display device of claim 7, wherein:
the touch electrode comprises a first electrode and a second electrode that are insulated from each other; and
the signal line comprises a first signal line connected to the first electrode and a second signal line connected to the second electrode.

9. The flexible display device of claim 8, wherein the touch panel further comprises:
a touch substrate configured to provide a base plane;
a first insulating layer covering the first electrode and the first signal line that are disposed on the base plane; and
a second insulating layer disposed on the first insulating layer and covering the second electrode and the second signal line.

10. The flexible display device of claim 9, wherein the first sensor comprises:
an acceleration sensor comprising a first electrode, a second electrode, and a motion electrode disposed between the first and second electrodes; and
a signal terminal connected to the motion electrode,
wherein the signal terminal is electrically connected to the first sensor signal line through a through-hole in the second insulating layer.

11. The flexible display device of claim 10, wherein the first coordinate signal is generated according to a difference between a first capacitance between the first electrode and the motion electrode and a second capacitance between the second electrode and the motion electrode.

12. The flexible display device of claim 9, wherein the first sensor signal line and the second sensor signal line are disposed on any one of the first insulating layer and the second insulating layer.

13. The flexible display device of claim 8, wherein the touch panel further comprises:
a touch substrate configured to provide a base plane;
a first insulating layer covering the first electrode and the first signal line that are disposed on the base plane; and
a second insulating layer disposed on the first insulating layer and covering the first signal line and the second signal line.

14. The flexible display device of claim 13, wherein:
the first sensor comprises:
an acceleration sensor comprising a first electrode, a second electrode, and a motion electrode disposed between the first and second electrodes; and
a signal terminal connected to the motion electrode; and
the signal terminal is electrically connected to the first sensor signal line through a through-hole in the second insulating layer.

15. The flexible display device of claim 13, wherein the first sensor signal line and the second sensor signal line are disposed on any one of the first insulating layer and the second insulating layer.

16. The flexible display device of claim 1, further comprising a window member disposed on the touch panel.

* * * * *